(12) United States Patent
Reuter

(10) Patent No.: US 11,473,955 B2
(45) Date of Patent: Oct. 18, 2022

(54) APPARATUS AND METHOD FOR SUPPLYING A LIQUID MEDIUM

(71) Applicant: MARCO SYSTEMANALYSE UND ENTWICKLUNG GMBH, Dachau (DE)

(72) Inventor: Martin Reuter, Dachau (DE)

(73) Assignee: MARCO SYSTEMANALYSE UND ENTWICKLUNG GMBH, Dachau (DE)

( * ) Notice: Subject to any disclaimer, the term of this patent is extended or adjusted under 35 U.S.C. 154(b) by 0 days.

(21) Appl. No.: 17/006,747

(22) Filed: Aug. 28, 2020

(65) Prior Publication Data

US 2021/0096012 A1 Apr. 1, 2021

(30) Foreign Application Priority Data

Aug. 29, 2019 (DE) .......................... 102019123200.7

(51) Int. Cl.
| | |
|---|---|
| *G01F 11/00* | (2006.01) |
| *G01F 11/08* | (2006.01) |
| *B05C 11/10* | (2006.01) |
| *B05C 5/02* | (2006.01) |

(52) U.S. Cl.
CPC .......... *G01F 11/086* (2013.01); *B05C 11/101* (2013.01); *B05C 11/1002* (2013.01); *G01F 11/006* (2013.01); *B05C 5/02* (2013.01); *B05C 11/1034* (2013.01); *B05C 11/1036* (2013.01); *B05C 11/1044* (2013.01)

(58) Field of Classification Search
CPC ........ G01F 11/086; G01F 11/006; B05C 5/02; B05C 11/1044; B05C 11/101; B05C 11/1034; B05C 11/1036; B05C 11/1002
See application file for complete search history.

(56) References Cited

U.S. PATENT DOCUMENTS

| | | | |
|---|---|---|---|
| 5,141,492 | A | 8/1992 | Dadson et al. |
| 6,099,269 | A | 8/2000 | Guerra et al. |
| 8,002,151 | B2 * | 8/2011 | Matthews ................ A47K 5/14 |
| | | | 222/190 |
| 9,718,069 | B2 * | 8/2017 | Creaghan ............. A47K 5/1211 |
| 2019/0225480 | A1 | 7/2019 | Singh |

FOREIGN PATENT DOCUMENTS

| | | |
|---|---|---|
| CN | 109922847 A | 6/2019 |
| DE | 19523370 A1 | 1/1997 |
| DE | 10240997 A1 | 3/2004 |
| DE | 102015219273 A1 | 4/2017 |
| GB | 484764 A | 7/1937 |
| JP | 05050586 A | 3/1993 |

(Continued)

OTHER PUBLICATIONS

Search Report received from the German Patent and Trademark Office dated May 28, 2020.

(Continued)

*Primary Examiner* — Frederick C Nicolas
(74) *Attorney, Agent, or Firm* — Dickinson Wright PLLC

(57) ABSTRACT

An apparatus for supplying a liquid medium to a metering unit comprises a housing in which media channels are arranged. One of the media channels is connected to a fluid reservoir that can be acted on by compressed air.

15 Claims, 2 Drawing Sheets

(56) References Cited

FOREIGN PATENT DOCUMENTS

| | | | |
|---|---|---|---|
| JP | 05131027 | A | 5/1993 |
| JP | 06226070 | A | 8/1994 |
| JP | 3020741 | U | 11/1995 |
| JP | 08196949 | A | 8/1996 |
| JP | 10299661 | A | 11/1998 |
| JP | 2002181838 | A | 6/2002 |
| JP | 2005305436 | A | 11/2005 |
| JP | 2006516317 | A | 6/2006 |
| JP | 2011523922 | A | 8/2011 |
| JP | 2015518572 | A | 7/2015 |
| JP | 2017128384 | A | 7/2017 |
| WO | 2018083056 | A1 | 5/2018 |

OTHER PUBLICATIONS

Japanese Office Action dated Sep. 3, 2021 (6 Pages).
Chinese Office Action dated Jul. 6, 2022 for counterpart Chinese Patent Application No. 202010885421.2.

* cited by examiner

APPARATUS AND METHOD FOR SUPPLYING A LIQUID MEDIUM

CROSS-REFERENCE TO RELATED APPLICATIONS

This application claims the priority of German Patent Application 102019123200.7, filed on Aug. 29, 2019, which is incorporated herein by reference in its entirety.

FIELD

The present invention relates to an apparatus and to a method for supplying a liquid medium to a metering unit, for example to a metering valve, that, for example, meters a two-component medium in the form of adhesive dots or adhesive lines onto a workpiece.

BACKGROUND

On the metering of such media, the supply of the already mixed components in constant and known quantities is associated with problems, on the one hand. On the other hand, the short pot life of such media can lead to problems since operating interruptions above the pot life change the viscosity of the premixed medium.

SUMMARY

It is the object of the present invention to provide an apparatus and a method for supplying a liquid medium to a metering unit by which the above-described problems are eliminated.

This object is satisfied by an apparatus having the features of claim 1 and in particular in that a housing is provided in which a first media channel is arranged that is variable in volume and that has at least one inlet and at least one outlet, wherein this first media channel can have pressure applied to it by a second media channel that is variable in volume and that is likewise arranged in the housing. The second media channel is connected to a fluid reservoir that can be acted on by pressure to effect a volume increase of the second media channel and thereby to apply pressure to the first media channel so that the medium present in the first media channel is expelled from it.

Due to such an apparatus, the advantage results, on the one hand, that the first media channel is configured separately from the second media channel so that the system for applying pressure does not come into contact with the medium to be metered, for example with an already premixed two-component mixture. On the other hand, the change in volume in the fluid reservoir, which is connected to the second media channel, can be determined very precisely, whereby it is possible to draw a conclusion with high accuracy on the volume of the liquid medium expelled from the first media channel. Finally, the advantage results from the arrangement of the two media channels in one housing that a very precise temperature control of the supplied liquid medium can take place so that a desired viscosity can be achieved during the metering.

In accordance with a further aspect, the present invention relates to a method for supplying a liquid medium to a metering unit, in which method a first media channel that is variable in volume is first filled with the medium and the medium present in the first media channel is subsequently expelled by expanding a second media channel that is variable in volume and that is arranged next to the first media channel. Such a method can in particular be carried out in cycles, wherein the volume increase of the second media channel can in particular be measured in every second cycle in order to determine, from this, the volume of the medium expelled from the first media channel.

Advantageous embodiments of the invention are described in the description, in the drawing, and in the dependent claims.

In accordance with a first advantageous embodiment, the housing can be provided with a heating device that can in particular comprise a temperature sensor and/or a temperature regulation device. The medium present in the first media channel can hereby be temperature-controlled to achieve a constant and desired viscosity on the metering.

In accordance with a further advantageous embodiment, the first and/or the second media channel can be at least partly areal, whereby a comparatively large amount of medium can be fed into the first media channel and expelled from it. If the first and/or the second media channel has/have film bags or is/are partly formed from a film bag, a large volume can be temperature-controlled and metered, wherein an exchange of the film bags, for example in the case of a hardened or already cured medium, is possible in a very cost-effective manner.

In accordance with a further advantageous embodiment, the second media channel can be closed at one side or can be closed by means of a shut-off element. The second media channel can hereby be expanded by an application of pressure to the fluid present in it, for example, to a liquid. If a shut-off element is provided, it can, for example, be opened for an initial filling of the second media channel or of the fluid reservoir and can otherwise be closed.

In accordance with a further advantageous embodiment, the inlet of the first media channel can be connected in one piece to a static mixer. Such a unit can be inexpensively manufactured and exchanged, for example, after an operating interruption that exceeds the pot life.

In accordance with a further advantageous embodiment, the reservoir can be provided with a filling level measurement device in order hereby to determine the volume increase of the second media channel. Since a medium present in the first media channel is expelled simultaneously with the volume increase of the second media channel, such a measurement also allows a conclusion to be drawn on the volume of the medium that was supplied to the metering unit. For example, it can be advantageous if the filling level measurement device is connected to an evaluation device that determines, from a change in the filling level, the volume that left the first media channel during the filling level change. It is also possible to monitor whether a hose has burst and the hardening mixture runs out.

In accordance with a further advantageous embodiment, the reservoir can be provided with a floating piston that can be acted on by pressure. On the one hand, a separation between the fluid within the reservoir and a pressure fluid, for example compressed air, is hereby achieved. On the other hand, the floating piston can be used to determine a change in the filling level within the reservoir, in particular in a contact-free manner, for example, by means of Hall sensors.

In accordance with a further advantageous embodiment, the housing has a hollow space that is adapted to receive the two media channels. Such a hollow space can, for example, have a volume that corresponds to the sum of the maximum or maximum desired volume of the first media channel and the minimum volume of the second media channel. In this way, it is ensured that the total medium present within the first expanded media channel is expelled when the second media channel has been filled with fluid.

In accordance with a further advantageous embodiment, the housing can be configured in at least two parts, wherein both parts are connectable to one another by a fast-closure. In this way, a rapid exchange of a media channel can be achieved. Snap-in closures, knurled screws, magnetic holders or the like can, for example, be considered as fast-closures.

The fluid present in the fluid reservoir can generally be any desired fluid. Due to the low compressibility, liquids are in particular suitable as a fluid for the reservoir and for the second media channel. Compressed air can be used to apply pressure to the fluid in the reservoir and can in particular be controlled and monitored by an electronic pressure regulator.

It can likewise be advantageous if the first media channel is not provided with only one outlet, but rather with a plurality of outlets since a plurality of metering units can then be supplied.

BRIEF DESCRIPTION OF THE DRAWINGS

The present invention will be described in the following purely by way of example with reference to an advantageous embodiment and to the enclosed drawings. There are shown.

DETAILED DESCRIPTION

Figure 1:
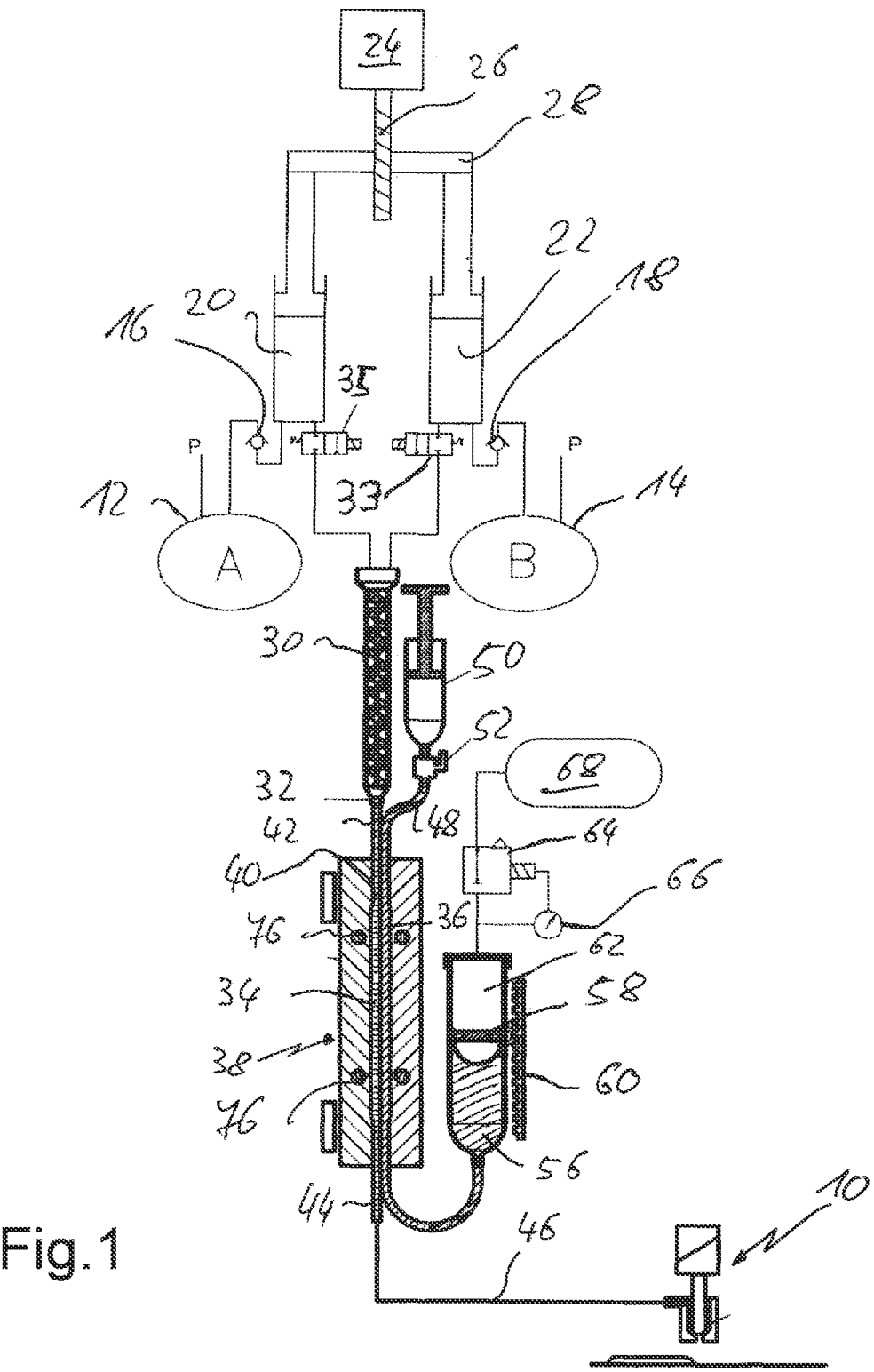
FIG. 1 a schematic representation of an apparatus for supplying a liquid medium to a metering unit.

FIG. 1 shows an apparatus for supplying a liquid medium, in the embodiment shown a two-component adhesive, to a metering unit 10. The liquid medium in this respect comprises two components A and B that are supplied from a respective tank 12 and 14 to a pump cylinder 20 and 22 via a respective check valve 16 and 18. The supply of the two components in this respect takes place at a pressure P that is sufficient to fill the two pump cylinders 20 and 22 with the respective component. The mixing ratio of the components A and B is in this respect determined by the diameter of the two pump cylinders.

A drive 24 serves to expel the components A and B from the pump cylinders 20 and 22 and moves a slide 28 downwardly from the position shown in FIG. 1 via a spindle 26, whereby the two components A and B are expelled from the pump cylinders 20 and 22 into a static mixer 30 after the blocking valves 33 and 35 have been displaced by a control, not shown, from the position shown into the open position.

The two components A and B are mixed with one another within the static mixer 30 and exit as a mixed medium through an outlet 32 of the static mixer into a first media channel 34 variable in volume. The first media channel 34 is arranged in a two-part housing 38 together with a second media channel 36 variable in volume.

Figure 2:
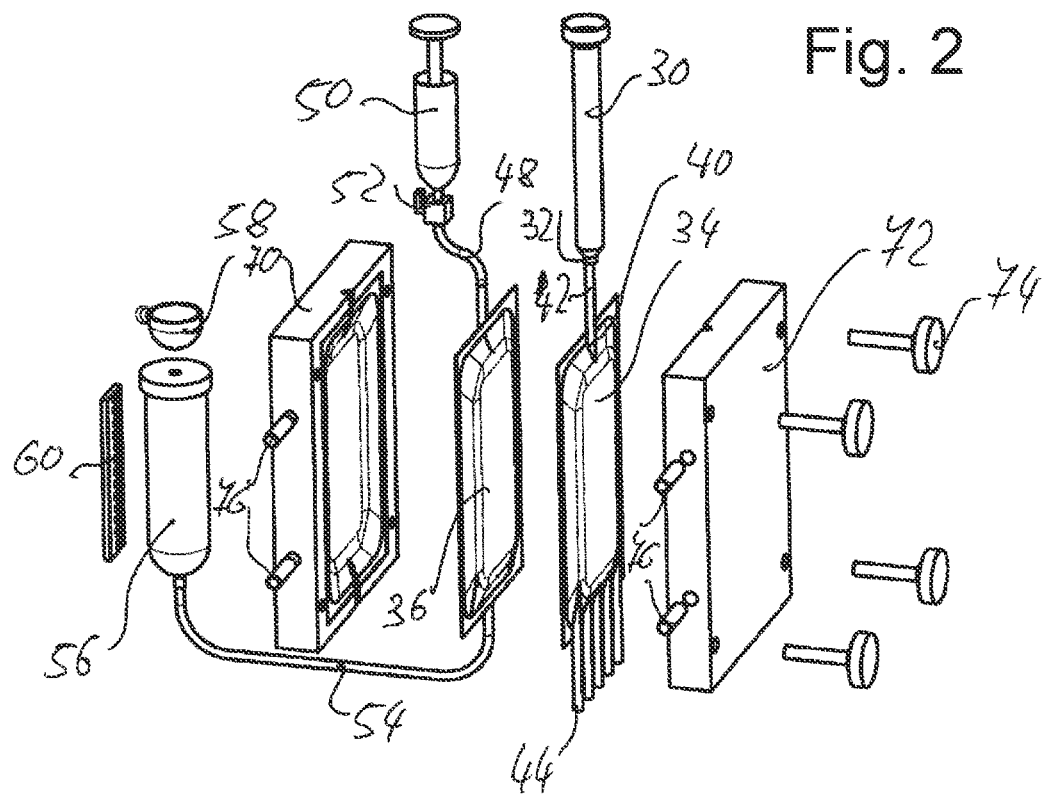
FIG. 2 an exploded representation of a part of the apparatus of FIG. 1.
Figures 3A, 3B, 3C:
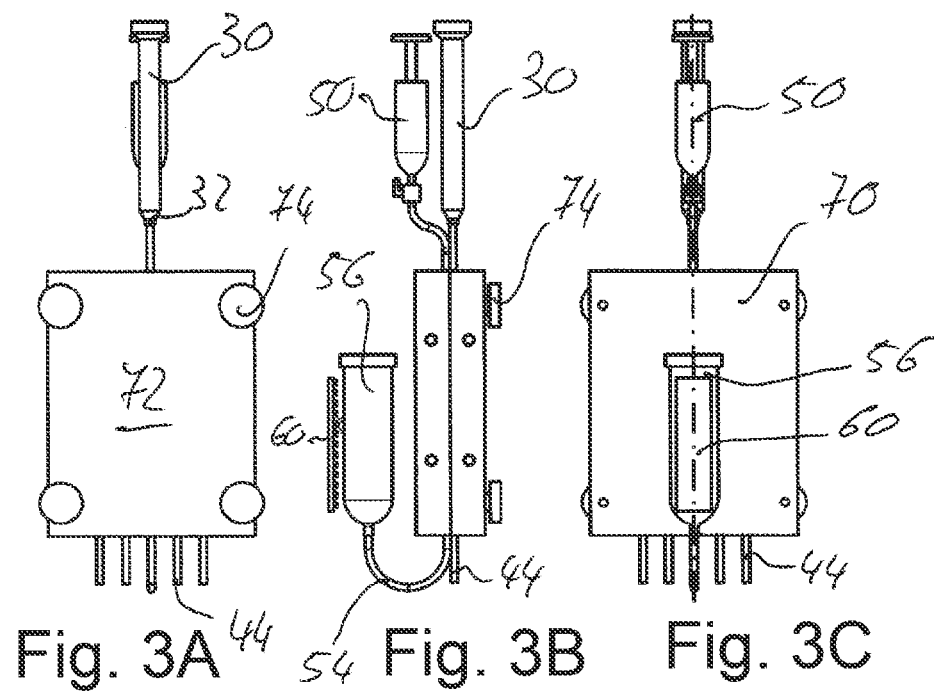
FIG. 3a a front view of the apparatus of FIG. 2 in the assembled state.
FIG. 3b a side view of the apparatus of FIG. 2 in the assembled state.

FIG. 2 illustrates that the first media channel 34 has a film bag, wherein an inlet 40 of the first media channel 34 is connected in one piece to the outlet 32 of the static mixer 30 via a hose connection 42. The inlet 40 of the first media channel 34, which is generally designed as a rectangular tubular bag, is arranged at its upper side, wherein a plurality of outlets 44 are formed at its lower side in the form of tube sections connected in one piece. Each of the tube sections 44 is connected to a metering unit 10 via a line 46 (FIG. 1).

The second media channel 36 that is likewise arranged within the housing 38 generally has the same size and shape as the first media channel 34, i.e. it is likewise configured as a film bag or a tubular bag and is connected at its upper side to a metering syringe 50 via a hose connection 48, wherein a stopcock 52 is provided between the hose connection 48 and the metering syringe 50.

A hose 54 is molded as an outlet to the lower side of the second media channel 36 and is connected to the lower side of a fluid reservoir 56. The fluid reservoir 56 is configured as a cylindrical cartridge, wherein a floating piston 58 is arranged in the inner space of the cartridge and is in contact-free cooperation with a filling level measurement device 60, provided outside the cartridge, to determine the respective filling level within the fluid reservoir 56.

The piston 58 has compressed air applied to it at its upper side by an air cushion 62, said compressed air being regulated by an electronic pressure regulator 64 and being measured by a measurement device 66. The compressed air is provided by a pressure tank 68, for example.

The fluid reservoir 56 is filled beneath the piston 58 with a supporting liquid, for example with silicone oil, that was introduced bubble-free into the second media channel 36 by the metering syringe 50. By applying compressed air to the piston 58, the fluid present within the fluid reservoir 56 and within the second media channel 36 can be acted on by pressure so that the second media channel 36 increases its volume, i.e. expands. Due to this expansion, a medium present within the first media channel 34 can be expelled in the direction of the metering unit when the two blocking valves 33 and 35 are closed.

As FIG. 2 in particular illustrates, the housing 38 in the embodiment shown is formed from two half-shells 70 and 72 that are connected to one another by means of knurled screws 74 that serve as a fast-closure. The two half-shells 70 and 72 form a hollow space in the interior that is adapted to receive the two media channels 34 and 36. The hollow space has a volume that corresponds to the maximum volume of one media channel plus the minimum volume of the other media channel. Furthermore, the housing 38 is provided with a plurality of heating cartridges 76 to control the temperature of the fluids in the first and second media channels via a temperature regulation device, not shown.

For a cyclical supply of a liquid medium to the metering unit 10, the medium from the two components A and B is premixed in the static mixer 30, as described above, and is subsequently introduced into the first media channel 36. In this respect, the supporting liquid present in the second media channel 36 is simultaneously displaced and expelled into the reservoir 56, whereby the filling level in the reservoir 56 changes and this filling level change is measured. When the blocking valves 33 and 35 are closed, the piston 58 is subsequently acted on by compressed air 62 so that the supporting liquid present within the second media channel 36 is acted on by pressure, whereby the medium present in the first media channel 34 can be expelled through the line 46 and the metering unit 10 when the latter is open. A complete expulsion of the medium present in the first media channel 34 can hereby take place. The volume of the first media channel 34 is subsequently minimized and the volume of the second media channel 36 is maximized. The filling level change that took place in this respect can be measured by the measurement device 60 and, from this measurement, a conclusion can be drawn in a very precise manner on the volume that was metered by the metering unit 10. In this respect, it is particularly advantageous that no components are in a direct connection with the metering medium for this measurement.

It is furthermore particularly advantageous that the unit comprising the static mixer 30 and the first media channel 34 with the outlets 44 molded thereat is designed as a disposable article or a disposable article composed of plastic that can be exchanged in a simple, inexpensive and fast manner after an operating interruption.

The invention claimed is:

1. An apparatus for supplying a liquid medium to a metering unit, the apparatus comprising a housing in which a first media channel is arranged that is variable in volume, that has at least one inlet and at least one outlet, and that can have pressure applied to the first media channel by a second media channel that is variable in volume and that is arranged in the housing, with the second media channel being connected to a fluid reservoir that can be acted on by pressure and that is provided with a filling level measurement device that measures, from a change in the filling level, the volume that left the first media channel during the filling level change.

2. The apparatus in accordance with claim 1, wherein the housing is provided with a heating device.

3. The apparatus in accordance with claim 1, wherein at least one of the first media channel and the second media channel is partly areal.

4. The apparatus in accordance with claim 3, wherein at least one of the first media channel and the second media channel comprises film bags.

5. The apparatus in accordance with claim 1, wherein the second media channel is closed at one side or can be closed by means of a shut-off element.

6. The apparatus in accordance with claim 1, wherein the inlet of the first media channel is connected in one piece to a static mixer.

7. The apparatus in accordance with claim 1, wherein the fluid reservoir is provided with a floating piston that can be acted on by pressure.

8. The apparatus in accordance with claim 1, wherein the housing has a hollow space that is adapted to receive the two media channels.

9. The apparatus in accordance with claim 1, wherein the housing is configured in at least two parts and both parts are connectable to one another by a fast-closure.

10. A method for supplying a liquid medium to a metering unit, the method comprising the following steps: filling a first media channel that is variable in volume with the liquid medium; and expelling the liquid medium present in the first media channel by expanding a second media channel that is variable in volume and that is arranged next to the first media channel, wherein a repeat filling of the first media channel takes place after the expulsion of the medium, and wherein a compression of the second media channel is effected on the filling, wherein an apparatus is used to supply the liquid medium to the metering unit, the apparatus comprising a housing in which the first media channel is arranged, with a pressure being able to be applied to the first media channel by the second media channel that is variable in volume and that is arranged in the housing, with the second media channel being connected to a fluid reservoir that can be acted on by pressure and that is provided with a filling level measurement device that measures, from a change in the filling level, the volume that left the first media channel during the filling level change.

11. The method in accordance with claim 10, wherein the expansion of the second media channel takes place by a liquid that is present in the second media channel and that is acted on by pressure.

12. The method in accordance with claim 10, wherein an expulsion of the medium and a repeat filling of the first media channel take place in cycles.

13. The method in accordance with claim 10, wherein a volume increase on the expansion of the second media channel is measured and, from said volume increase, the volume of the medium expelled from the first media channel is determined.

14. The method in accordance with claim 10, wherein the medium present in the first media channel is temperature-controlled.

15. A disposable article for use in an apparatus, the apparatus comprising a housing in which a first media channel is arranged that is variable in volume, that has at least one inlet and at least one outlet, and that can have pressure applied to the first media channel by a second media channel that is variable in volume and that is arranged in the housing, with the second media channel being connected to a fluid reservoir that can be acted on by pressure and that is provided with a filling level measurement device that measures, from a change in the filling level, the volume that left the first media channel during the filling level change or in a method for supplying a liquid medium to a metering unit, the method comprising the following steps: filling a first media channel that is variable in volume with the liquid medium; and expelling the liquid medium present in the first media channel by expanding a second media channel that is variable in volume and that is arranged next to the first media channel, wherein a repeat filling of the first media channel takes place after the expulsion of the medium, and wherein a compression of the second media channel is effected on the filling, the disposable article comprising a static mixer to which a film bag is molded via a hose connection, said film bag having at least one molded on outlet.

* * * * *